United States Patent [19]

Nakamura

[11] E Re. 28,591

[45] Reissued Oct. 28, 1975

[54] OPTICAL SYSTEM FOR THE MAGNIFICATION VARYING PORTION OF AN ULTRA-TELEPHOTO TYPE ZOOM LENS

[75] Inventor: Soichi Nakamura, Kamakura, Japan

[73] Assignee: Nippon Kogaku K.K., Tokyo, Japan

[22] Filed: Apr. 22, 1974

[21] Appl. No.: 463,160

Related U.S. Patent Documents

Reissue of:

[64] Patent No.: 3,743,384
Issued: July 3, 1973
Appl. No.: 208,637
Filed: Dec. 16, 1971

[30] Foreign Application Priority Data

Dec. 24, 1970 Japan ..... 45-116646

[52] U.S. Cl. ..... 350/184; 350/177; 350/214
[51] Int. Cl. ..... G02b 15/16
[58] Field of Search ..... 350/184, 186, 214

[56] References Cited

UNITED STATES PATENTS

| | | | |
|---|---|---|---|
| 3,501,224 | 3/1970 | Takashashi | 350/184 |
| 3,615,125 | 10/1971 | Higuchi et al. | 350/184 |

*Primary Examiner*—John K. Corbin
*Attorney, Agent, or Firm*—Fitzpatrick, Cella, Harper & Scinto

[57] ABSTRACT

An optical system for the magnification varying portion of an ultra-telephoto type zoom lens comprises three lens groups of convergence, divergence and convergence disposed in the named order as viewed from the object. The optical system has a power arrangement determined by certain conditions. The first group of convergence comprises two components, of which the first one is a single biconvex lens and the second component consists of three lenses, convex, concave and convex, respectively. These three lenses are such that the refractive index of the intermediate concave lens is greater than that of its preceding convex lens but smaller than that of its succeeding convex lens. The second component of the first group also forms a positive meniscus lens system generally convex to the object side. The second group of divergence comprises three components, of which the first one is a negative component consisting of a convex and a concave lens joined together with their interface being concave to the object side, and these two lenses are arranged so that the preceding one has a greater refractive index [ that] *than* the other. The second and third components of the second group may be individual, single, biconcave lenses. The third group of convergence may comprise two components, both of which are positive composite lenses. The first component of the third group is in the form of a meniscus lens generally concave to the object side and the second component of the third group has its interface concave to the object side. The lenses forming the second component of the third group are such that the lens before the interface has a smaller refractive index than the one behind the interface.

6 Claims, 9 Drawing Figures

OPTICAL SYSTEM FOR THE MAGNIFICATION VARYING PORTION OF AN ULTRA-TELEPHOTO TYPE ZOOM LENS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an ultra-telephoto type zoom lens, and more particularly to the [ optional ] *optical* system forming the magnification varying portion of such zoom lens.

2. Description of the Prior Art

In order to reduce its total axis length, lenses of long focus have heretofore used a so-called telephoto type optical system, which comprises a forward lens group having an axial length shorter than the focal length of the entire system and a divergent lens group disposed behind the forward lens group. If a smaller value was selected for the telephoto ratio (i.e., the ratio of the total axial length to the focal length of the lens system), residual chromatic aberration known as secondary spectrum in the forward lens group would be accentuated in the succeeding divergent lens group. Another limitation of such a lens system is that the Petzval sum tends to be negative.

Recently, large-size glass blanks, having a good partial dispersion characteristic such as quartzite and the like, have been put into use to thereby facilitate the correction of the secondary spectrum to a considerable extent, and accordingly, highly improve the correction of the chromatic aberration over the conventional system. This has led to the fact that the lower limit of the telephoto ratio is determined by the tolerance of the Petzval sum rather than by the tolerance of the chromatic aberration. The use of quartzite or other special optical glass is also expected to have a substantial effect in the case of zoom lenses, but it will cause problems as to the balance between the chromatic aberration and the other aberrations in the entire system and to the compatibility between the large size of the optical glass and the compactness of the resulting entire lens system.

SUMMARY OF THE INVENTION

The present invention provides a very compact optical system whose entire axial length is only six- to seven-tenths of its maximum focal length. This is achieved by partly modifying the known zoom type so as to greatly reduce *the variation in* the various aberrations, due to zooming, in the magnification varying portion and, thereby, greatly reduce the scale of the magnification varying portion, and by using, as a relay lens system, an optical system which forms a telephoto type system having a positive Petzval sum. This results in very excellent correction of monochromatic aberration, which in turn enables the chromatic aberration throughout the entire system to be greatly reduced by the effective use of certain special optical materials and, thus, it is possible to provide a still camera zoom lens having no infrared calibration.

The magnification varying system assumes an afocal or nearly equivalent type of arrangement consisting of convergence, divergence and convergence. With a conventional afocal magnification varying system of a similar type which comprises convergent, divergent and convergent groups, variation of magnification has been accomplished by displacement of the second group, and displacement of the focal point has been accomplished by causing a "U-turn" movement of the first or the third convergent group. At the peak of such "U-turn" movement, the object point and the image point with respect to the second group are in equidistant relationship. In this type of magnification, the curve of movement, after passing the peak of the U-turn, tends to present a greater gradient which causes mechanical difficulties in the manufacturing of a cam. For this reason, in a certain type of zoom lens, the third convergent group has further been divided into two sub-groups, divergent and convergent, of which the forward divergent sub-group is arranged for the small U-turn movement, convex to the object side, to alleviate the aforesaid difficulties. In any event, however, the type which basically uses such an afocal magnification varying system of convergence, divergence and convergence, has made it a rule to locate the peak of the U-turn movement of the third (or first) group in the vicinity of the mid-point of the whole lens system. Furthermore, in a zoom lens provided with such a magnification varying system, the sine condition tends to be more or less negative at the shorter focal length side and positive at the longer focal length side, and the disadvantage of this type of zoom lens has become pronounced by reducing the scale of the magnification varying system in the zoom lens. Therefore, where the total axial length of the entire lens system is to be reduced down to seven-tenths or less of its maximum focal length, the variation in coma, due to zooming in the magnification varying system, is too great, thereby preventing compact formation of the entire lens system.

In contrast, according to the present invention, the power arrangement of each of the convergent, divergent and convergent groups forming the magnification varying system is determined so that the peak position of the U-turn movement of the system can be outward of its maximum focal length, and so that in the zooming range the third group moves, not in a U-pattern, but in a curve having the same direction as the movement of the second group. The greatest advantage resulting from the use of such zoom range is a simplified construction and, accordingly, an enhanced manufacturing accuracy of the cam, as well as stabilized coma throughout the entire zoom lens, which is provided by the unidirectionally curved movement of the third group. Thus, both the optical and mechanical accuracies permit the scale of the magnification varying system to be substantially reduced.

If such a zoom system is employed, a telephoto type zoom lens, having a small telephoto ratio, the ratio of its entire axial length to its maximum focal length in a zoom lens, could be designed simply by only taking into account the tolerance of the Petzval sum and the chromatic aberration. In other words, by using a relay lens having a positive Petzval sum, it is possible to obtain such a reduced scale of the magnification varying system as will negate the positive Petzval sum. Further, higher achromatism is achieved by the use of quartzite or other optical material having a good partial dispersion characteristic, thereby making it possible to reduce the scale of the magnification varying system.

BRIEF DESCRIPTION OF THE DRAWINGS

The present invention will be more fully described with reference to the accompanying drawings, in which.

DESCRIPTION OF THE PREFERRED EMBODIMENTS

Figure 1:
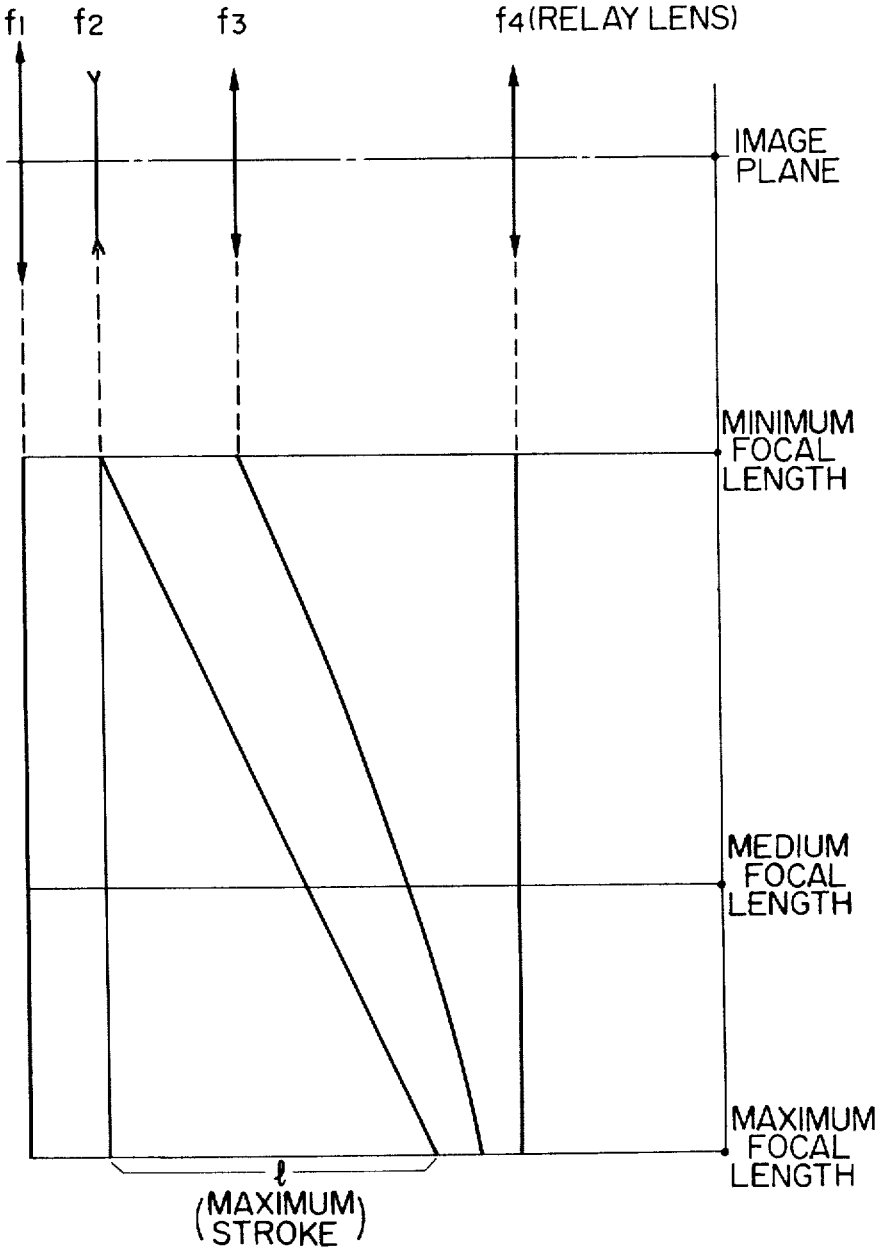
FIG. 1 is a diagram illustrating the basic construction of the present invention and the process of movement of the components thereof.
Figure 2:
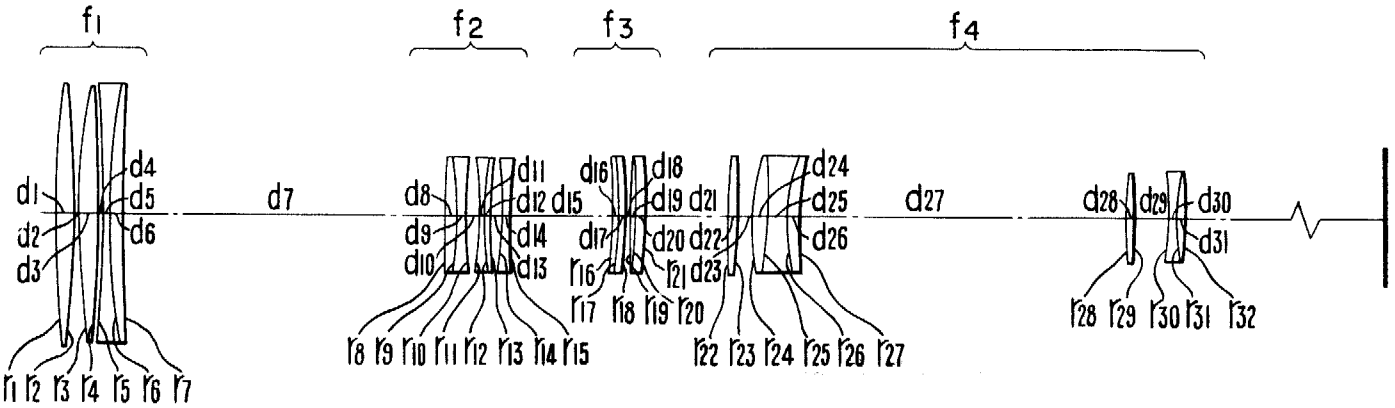
FIG. 2 is a longitudinal sectional view of one embodiment of the present invention.
Figure 3:
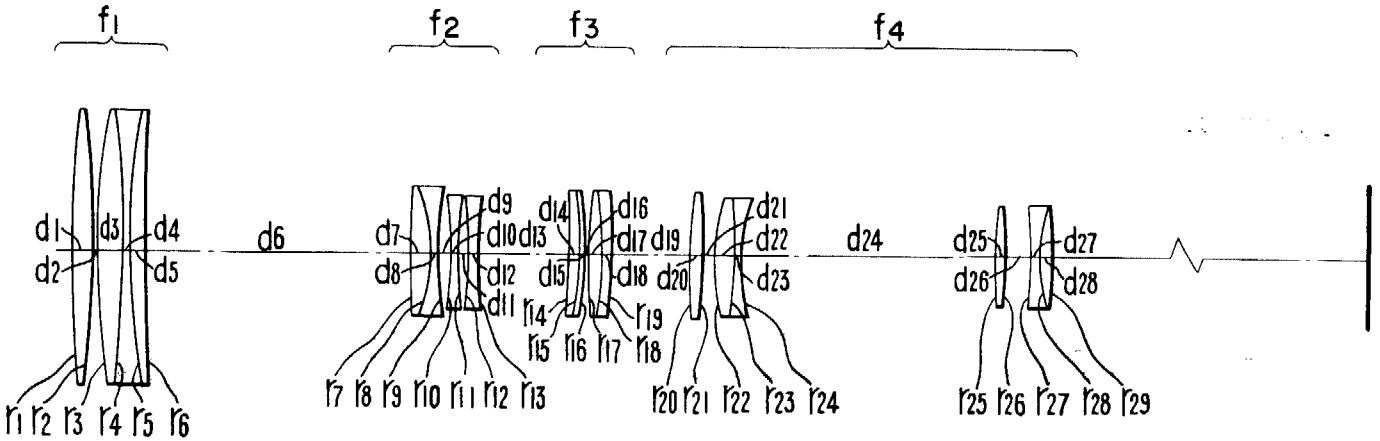
FIG. 3 is a longitudinal, sectional view similar to FIG. 2, but showing another embodiment of the invention.
Figure 4A:
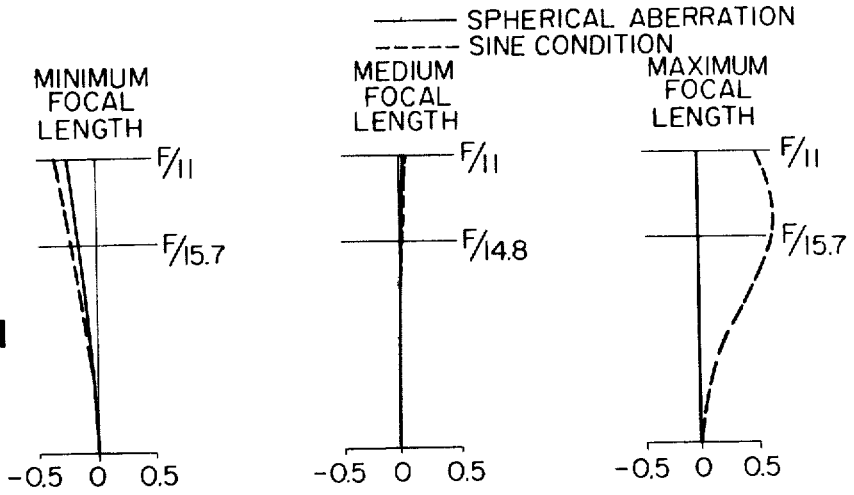
FIG. 4a is a graphical illustration of the spherical aberration for the minimum, medium and maximum focal lengths of the embodiment of FIG. 2.
Figure 4B:
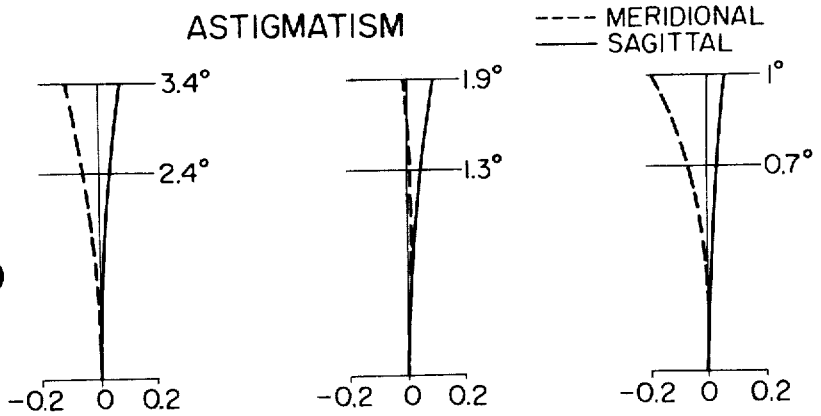
FIG. 4b is a graphical illustration of the astigmatism for the minimum, medium and maximum focal lengths of the embodiment of FIG. 2.
Figure 4C:
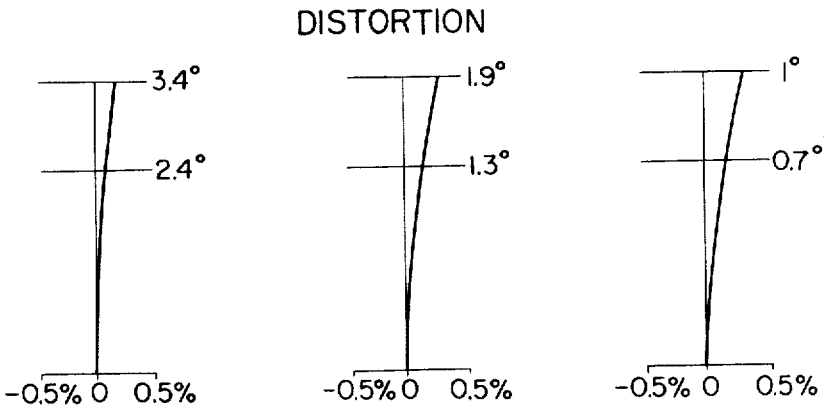
FIG. 4c is a graphical illustration of the distortional aberration for the minimum, medium and maximum focal lengths of the embodiment of FIG. 2.

In FIG. 1, there is diagrammatically shown a magnification varying system for an ultra-telephoto zoom lens which comprises a first group of convergence, a second group of divergence and a third group of convergence, disposed in the named order as viewed from an object. The magnification varying system has a power arrangement determined by the following relations:

$$[(M+1)/(M-1)]l < f_1 < 1.2\,[(M+1)/(M-1)]l, \quad (1)$$

$$0.8\,l/(1-M) < f_2 < 1.1\,l/(1-M) \quad (2)$$

$$2\,l/(M-1) < f_3 < 3.0\,l/(M-1) \quad (3)$$

where $f_1$, $f_2$ and $f_3$ represents the focal lengths of the successive lens groups, M represents the zoom ratio of the system and l the maximum stroke of movement of the second group for effecting a varying magnification. The first group of convergence includes two components, of which the first one comprises a single biconvex lens and the second component comprises three positive, negative and positive lenses joined together. (These three lenses may be separate from one another with some air gaps interposed therebetween if they are large-diametered lenses, as described hereinafter in Example I.) These three lenses maintain the following relations:

$$\left.\begin{array}{l} n_{12F} < n_{12M} \\ n_{12R} < n_{12M} \end{array}\right\} \quad (4)$$

where $n_{12F}$, $n_{12M}$ and $n_{12R}$ represent the refractive indices of the successive lenses in the second component of the first group. Moreover, the second component of the first group is in the form of a positive meniscus lens generally convex to the object side. The second group of divergence includes three components, of which the first one is a negative doublet comprising two positive and negative lenses joined together with their interface being concave to the object side. These two lenses satisfy the following relation:

$$n_{21F} < n_{21R} \quad (5)$$

where $n_{21F}$ and $n_{21R}$ represent the refractive indices of the two lenses. As a rule, the second and third components of the second group may both be individual single biconcave lenses, but where a better achromatism of the second group is required, these components may comprise an achromatic composite lens known as hyperchromatic lens, as described hereinafter in Example I. The third group of convergence comprises two components, both of which are positive composite lenses. The first one of these two components is in the form of a meniscus which is generally concave to the object side and the second component has its interface generally concave to the object side and satisfies the following relation:

$$n_{32F} < n_{32R} \quad (6)$$

where $n_{32F}$ and $n_{32R}$ represent the refractive indices of the glass materials forming the lenses disposed before and behind the said interface.

A description of the foregoing various conditions and the respective components of the successive lens groups follows:

Conditions (1) to (4) together serve to form the skeleton of the zoom lens in the Gauss area, which provides the basic part of the zoom lens.

The lower limit of condition (1) provides a limit within which the first convergent group and the second divergent group, at the minimum focal length side of the afocal zoom lens, do not mechanically interfere with each other. Below such limit, mechanical interference could not be avoided unless a special arrangement is adopted whereby the principal plane of either the first group or the second group is positioned outwardly of the lens system. The upper limit of condition (1) is a limit for avoiding an unnecessarily excessive spacing between the first and second groups at the minimum focal length side of the zoom lens.

Condition (2) expresses the values that are assumed by the second group for preventing the third group from taking a U-turn movement, the values being given in terms of the maximum stroke l of such movement and the zoom ratio M. The lower limit of this condition serves to avoid the tendency of the second group to increase its stroke of movement in order to secure a predetermined zoom ratio, because in such a zoom lens the third and second groups are moved in the same direction for the correction of the focal point. In other words, if the value of $f_2$ is less than the lower limit, the second group must move over a longer stroke for the same zoom ratio and this will make the zoom lens lose its compactness. The upper limit of the condition now under consideration is intended to avoid the U-turn movement of the third group in the magnification varying system. If the upper limit is exceeded, the U-pattern movement would appear as described hereinbefore in connection with the prior art.

Condition (3) determines the range of values available for the third group in order to maintain the magnification varying system afocal with respect to the movement of the second group, which has been determined by condition (2). The lower limit of condition (3) serves to prevent any mechanical interference between the third and second groups, and the upper limit is intended to prevent any excessive spacing between these groups at the maximum focal length side.

After such a skeleton in the Gauss area has been formed, the shapes to be selected for various groups are also important in respect to the aberrational area.

The second component of the first group is a triplet comprising a positive lens, a negative lens and a positive lens joined together. If a doublet comprising a positive lens and negative lens was used, it would never enable the secondary spectrum to be greatly reduced, even if glass material of special partial dispersion characteristics was used. The most suitable form for effectively reducing the secondary spectrum, using the least number of components, is that known as the apochromat of three lenses cemented together.

Thus, the correction of the chromatic aberration at the maximum focal length side, which correction has usually been the greatest problem in reducing the scale of the magnification varying system in a zoom lens, can be accomplished completely satisfactorily. The chromatic aberration may be further decreased and the axial length of the magnification varying system may be further reduced, either by also using a material of good partial dispersion characteristics for the first component of the first group, or by regarding the negative and positive elements of the second component as an apparent divergent lens and varying the partial dispersion characteristics of such apparent divergent lens by the use of different glass materials in combination, thereby negating the chromatic aberration by the combination of such glass materials and through the preceding convergent lens. The second component of the first group, using such glass materials or quartzite, which is in the form of an apochromat, must also have the spherical aberration sufficiently removed therefrom, and condition (4) represents the limit of the refractive index which is imposed for such purpose. Further, in order to balance the various aberrations throughout the entire system and minimize the displacement of the spherical aberration during a close-up shot, it is necessary that the first component of the first group take the form of a biconvex lens and the second component take the form of a positive meniscus lens.

The three-component and two-component formation of the third and second groups, respectively, is a requisite for maintaining a good balance between the spherical aberration and the astigmatism throughout the entire zoom range in an optical system whose power is determined by the conditions (2) and (3). Moreover, the condition (5) imposed upon the first component of the second group and the concavity of its interface with respect to the object side are required primarily to balance the spherical aberration throughout the entire range, as well as to minimize the variation in astigmatism.

The meniscus shape of the first component of the third convergent group is intended to prevent over correction of the astigmatism and coma in the medium focal length, when the aberrations remain balanced at the opposite sides, i.e., at the minimum and maximum focal length sides. Also, in view of the requirement that the achromatism of the third group must be overcorrected to keep it balanced with respect to the high degree of correction of the chromatic aberration in the first group, the third group is made to assume the form of a doublet. Further, the concavity of the interface in the second component of the third group with respect to the object side and condition (6) are required to maintain a good correction of the spherical aberration in the third group as a whole, as well as to minimize the chromatic variation of the spherical aberration and astigmatism.

Figure 5A:
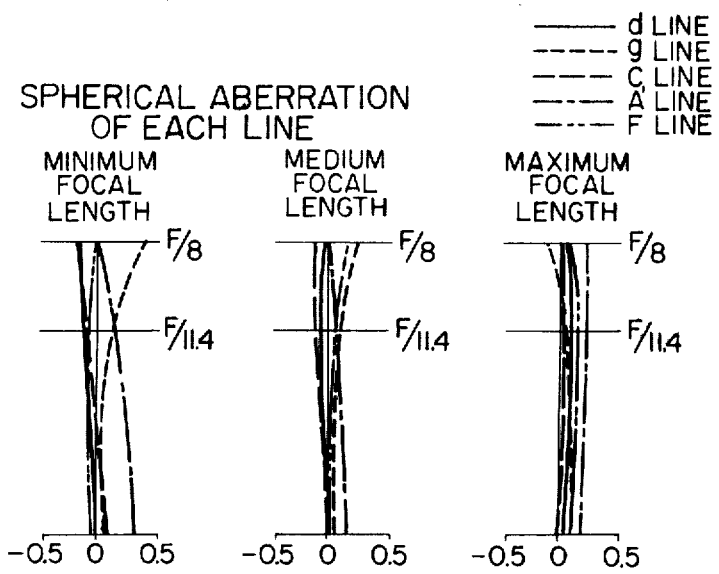
FIG. 5a is a graphical illustration of the spherical aberration for the minimum, medium and maximum focal lengths of the embodiment of FIG. 3.
Figure 5B:
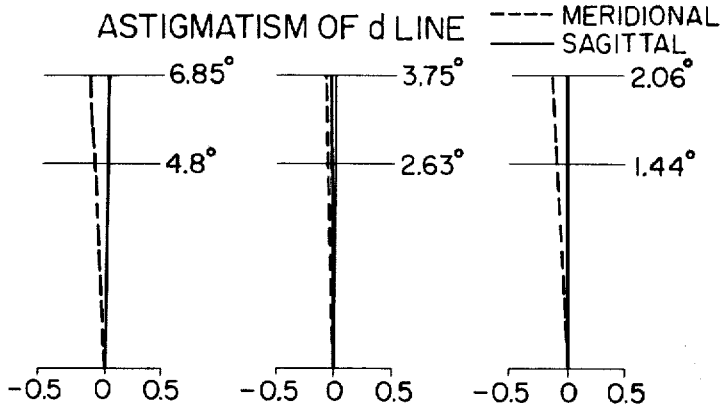
FIG. 5b is a graphical illustration of the astigmatism for the minimum, medium and maximum focal lengths of the embodiment of FIG. 3.
Figure 5C:
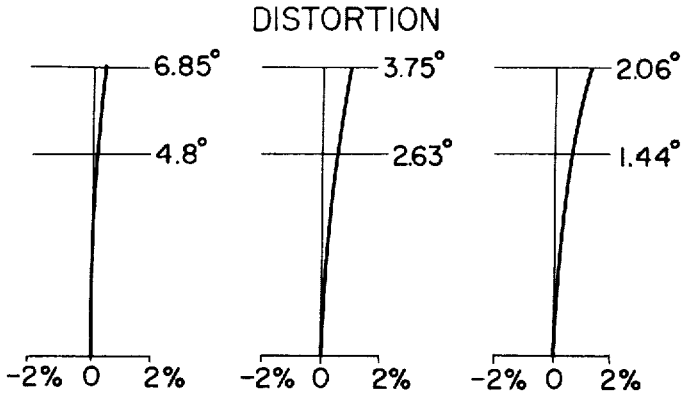
FIG. 5c is a graphical illustration of the distortional aberration for the minimum, medium and maximum focal lengths of the embodiment of FIG. 3.

Now that the power arrangement of each group in the Gauss area and the basic shapes of the components in the aberrational area have been determined, a good solution can be readily obtained by following up the light rays. Where it is desired to make the entire system compact, the relay lens should desirably be of the telephoto type whose Petzval sum is positive, whereby the scale of the zoom lens can be further reduced. In the embodiments illustrated herein, it will be seen that three or four telephoto type lenses are used for the forward group and three such lenses for the rearward group, thereby providing a zoom lens of an extremely reduced telephoto ratio, such as 0.6 to 0.7, for example. These embodiments are both concerned with an ultra-telephoto type zoom lens for 35 mm still cameras, and especially in Example II (FIG. 5), it will be seen that correction of the sphercial aberration is good enough to cover even up to A'-line, thus providing a zoom lens which requires substantially no infrared calibration.

Various numerical data in the embodiments of the present invention will be shown in the tables below, where $r_1, r_2 \ldots r_n$ represent the radii of curvature of the successive lenses, $d_1, d_2 \ldots d_{n-1}$ the center thicknesses or air gaps of the successive lenses, $n_1, n_2 \ldots n_k$ the refractive indices of the glass materials for d-line, and $v_1, v_2 \ldots v_k$ the Abbe numbers of such glasses.

EXAMPLE I

Zoom lens for 35mm still camera.

Focal length f=360 – 1,200mm; Relative aperture F/11; Telephoto ratio 0.61.

| | | | | |
|---|---|---|---|---|
| $r_1$= 420.955 | $r_1$=+441.5 | | | |
| | | $d_1$=8.0 | $n_1$=1.48606 | $v_1$=81.5 |
| | $r_2$=−580.0 | | | |
| | | $d_2$=0.2 | | |
| | $r_3$=+274.2 | | | |
| | | $d_3$=9.5 | $n_2$=1.48606 | $v_2$=81.5 |
| | $r_4$=−638.1 | | | |
| | | $d_4$=1.0 | | |
| | $r_5$=−638.1 | | | |
| | | $d_5$=4.0 | $n_3$=1.744 | $v_3$=44.9 |
| | $r_6$=+298.2 | | | |
| | | $d_6$=6.0 | $n_4$=1.58913 | $v_4$=61.2 |
| | $r_7$=+1281.5 | | | |
| | | $d_7$=11.258–211.258 | | |

| | | | | |
|---|---|---|---|---|
| $f_2=$ −86.956 [$r_{12}$=+118.3] | $r_8$=+8939.7 | $d_8$=4.7 | $n_5$=1.75520 | $\nu_5$=27.5 |
| | $r_9$=−126.6 | $d_9$=2.6 | $n_6$=1.58913 | $\nu_6$=61.2 |
| | $r_{10}$=+172.9 | $d_{10}$=6.0 | | |
| | $r_{11}$=−166.7 | $d_{11}$=1.3 | $n_7$=1.48606 | $\nu_7$=81.5 |
| | *$r_{12}$=+118.3* | $d_{12}$=3.0 | $n_8$=1.58875 | $\nu_8$=51.2 |
| | $r_{13}$=+238.7 | $d_{13}$=6.0 | | |
| | $r_{14}$=−149.8 | $d_{14}$=2.6 | $n_9$=1.5168 | $\nu_9$=64.2 |
| | $r_{15}$=+444.7 | $d_{15}$=64.853–4.248 | | |
| $f_3=$ 190.565 | $r_{16}$=−3106.9 | $d_{16}$=3.5 | $n_{10}$=1.62041 | $\nu_{10}$=60.3 |
| | $r_{17}$=−134.2 | $d_{17}$=2.6 | $n_{11}$=1.61293 | $\nu_{11}$=36.9 |
| | $r_{18}$=−203.7 | $d_{18}$=0.2 | | |
| | $r_{19}$=+398.1 | $d_{19}$=4.7 | $n_{12}$=1.48606 | $\nu_{12}$=81.5 |
| | $r_{20}$=−143.2 | $d_{20}$=2.6 | $n_{13}$=1.75520 | $\nu_{13}$=27.5 |
| | $r_{21}$=−246.4 | $d_{21}$=143.138–3.744 | | |
| $f_4=$ 537.805 | $r_{22}$=+344.6 | $d_{22}$=4.0 | $n_{14}$=1.51454 | $\nu_{14}$=54.6 |
| | $r_{23}$=−577.7 | $d_{23}$=6.2 | | |
| | $r_{24}$=+85.8 | $d_{24}$=6.0 | $n_{15}$=1.48606 | $\nu_{15}$=81.5 |
| | $r_{25}$=−1535.0 | $d_{25}$=13.5 | $n_{16}$=1.744 | $\nu_{16}$=44.9 |
| | $r_{26}$=+80.0 | $d_{26}$=6.3 | $n_{17}$=1.6393 | $\nu_{17}$=45.0 |
| | $r_{27}$=+136.359 | $d_{27}$=139.4 | | |
| | [$r_{28}$=385.1] *$r_{28}$=+385.1* | $d_{28}$=2.7 | $n_{18}$=1.50137 | $\nu_{18}$=56.5 |
| | [$r_{29}$=385.1] [$d_{29}$=15.2] *$r_{28}$=+385.1* | *$d_{29}$=15.2* | | |
| | $r_{30}$=−124.9 | $d_{30}$=2.8 | $n_{19}$=1.74443 | $\nu_{19}$=49.4 |
| | $r_{31}$=+87.5 | $d_{31}$=4.4 | $n_{20}$=1.60342 | $\nu_{20}$=38.0 |
| | [$r_{32}$=200.4] *$r_{32}$=−200.4* | | | |

EXAMPLE II

Zoom lens for 35mm still camera.

Focal length f=180 – 600mm; Relative aperture F/8

Telephoto ratio 0.7.

| | | | | |
|---|---|---|---|---|
| $f_1=$ 244.0 | $r_1$=+264.9 | $d_1$=7.0 | $n_1$=1.51728 | $\nu_1$=69.6 |
| | $r_2$=−370.0 | $d_2$=0.2 | | |
| | $r_3$=+174.9 | $d_3$=8.2 | $n_2$=1.48606 | $\nu_2$=81.5 |
| | $r_4$=−353.1 | $d_4$=2.0 | $n_3$=1.74950 | $\nu_3$=35.0 |
| | $r_5$=+180.8 | $d_5$=5.0 | $n_4$=1.59507 | $\nu_4$=35.6 |
| | $r_6$=+1195.6 | $d_6$=2.474–118.311 | | |
| $f_2=$ −50.3639 | $r_7$=+5000.0 | $d_7$=4.8 | $n_5$=1.7847 | $\nu_5$=26.1 |
| | $r_8$=−70.3 | $d_8$=1.5 | $n_6$=1.62041 | $\nu_6$=60.3 |
| | $r_9$=+104.02 | $d_9$=4.0 | | |
| | $r_{10}$=−96.6 | $d_{10}$=2.0 | $n_7$=1.5168 | $\nu_7$=64.2 |
| | $r_{11}$= +220.9 | $d_{11}$=4.0 | | |
| | $r_{12}$=−83.0 | $d_{12}$=1.5 | $n_8$=1.5168 | $\nu_8$=64.2 |
| | $r_{13}$=+287.5 | $d_{13}$=38.532–3.430 | | |

| | | | | |
|---|---|---|---|---|
| $f_3=$ [133.2688] *113.2688* | $r_{14}=-1850.0$ | $d_{14}=4.0$ | $n_9=1.62041$ | $\nu_9=60.3$ |
| | $r_{15}=-77.683$ | $d_{15}=1.5$ | $n_{10}=1.59551$ | $\nu_{10}=39.2$ |
| | $r_{16}=-122.917$ | $d_{16}=0.1$ | | |
| | [$r_{17}=-251.3$] *$r_{17}=+251.3$* | $d_{17}=5.3$ | $n_{11}=1.51728$ | $\nu_{11}=69.6$ |
| | $r_{18}=-85.15$ | $d_{18}=1.5$ | $n_{12}=1.75520$ | $\nu_{12}=27.5$ |
| | $r_{19}=-157.5$ | $d_{19}=83.912-3.177$ | | |
| [$f_{14}=$] $f_4=$ 275.744 | $r_{20}=+203.9$ | $d_{20}=3.6$ | $n_{13}=1.51728$ | $\nu_{13}=69.6$ |
| | $r_{21}=-309.7$ | $d_{21}=3.2$ | | |
| | $r_{22}=+47.9$ | $d_{22}=6.2$ | $n_{14}=1.48606$ | $\nu_{14}=81.5$ |
| | $r_{23}=-459.0$ | $d_{23}=2.3$ | $n_{15}=1.717$ | $\nu_{15}=47.9$ |
| | $r_{24}=+70.7$ | $d_{24}=71.5$ | | |
| | $r_{25}=+271.0$ | $d_{25}=2.7$ | $n_{16}=1.5168$ | $\nu_{16}=64.2$ |
| | $r_{26}=-165.7$ | $d_{26}=7.8$ | | |
| | $r_{27}=-75.9$ | $d_{27}=1.4$ | $n_{17}=1.76684$ | $\nu_{17}=46.6$ |
| | $r_{28}=+51.5$ | $d_{28}=4.8$ | $n_{18}=1.59507$ | $\nu_{18}=35.6$ |
| | $r_{29}=-97.9$ | | | |

What is claimed is:

1. An optical system for an ultra-telephoto type zoom lens system comprising a magnification varying portion including a first convergence lens group, a second divergence lens group, a third convergence lens group and a relay lens group disposed in the named order, said first, second and third lens groups forming an afocal magnification varying system, said second and third groups being axially differently movable in the same direction, and said relay lens group forming a telephoto system having a positive Petzval sum; said first group including two components, of which the first component is a single biconvex lens, and the second component consists of a biconcave lens, a biconcave lens and a convex meniscus lens, these three lenses cemented together; said second group including three components of which the first component consists of a biconvex lens and a biconcave lens cemented together, the second and third components are single biconcave lenses, respectively; said third group including two components of which the first component consists of two meniscus lenses cemented together and the curvature of the cemented surface being concave to the object side, and the second component consists of a biconvex lens and a concave meniscus lens cemented together [; and said relay lens group including two portions of which the first portion comprises two components, the first component thereof being a single biconvex lens, and the second component being a biconvex and biconcave lenses cemented together, and the second portion comprises two components, the first component thereof being a single biconvex lens and the second component being a biconcave and biconvex lenses cemented together].

2. An optical system according to claim 1, possessing the following dimensions and relationships;

f = 180–600 mm, F/8 telephoto ratio 0.7

| | | | | |
|---|---|---|---|---|
| $f_1=$ 244.0 | $r_1=+264.9$ | $d_1=7.0$ | $n_1=1.51728$ | $\nu_1=69.6$ |
| | $r_2=-370.0$ | $d_2=0.2$ | | |
| | $r_3=+174.9$ | $d_3=8.2$ | $n_2=1.48606$ | $\nu_2=81.5$ |
| | $r_4=-353.1$ | $d_4=2.0$ | $n_3=1.74950$ | $\nu_3=35.0$ |
| | $r_5=+180.8$ | $d_5=5.0$ | $n_4=1.59507$ | $\nu_4=35.6$ |
| | $r_6=+1195.6$ | $d_6=2.474-118.311$ | | |
| $f_2=$ −50.3639 | $r_7=+5000.0$ | $d_7=4.8$ | $n_5=1.7847$ | $\nu_5=26.1$ |
| | $r_8=-70.3$ | $d_8=1.5$ | $n_6=1.62041$ | $\nu_6=60.3$ |
| | $r_9=+104.02$ | $d_9=4.0$ | | |
| | $r_{10}=-96.6$ | $d_{10}=2.0$ | $n_7=1.5168$ | $\nu_7=64.2$ |
| | $r_{11}=+220.9$ | $d_{11}=4.0$ | | |
| | $r_{12}=-83.0$ | $d_{12}=1.5$ | $n_8=1.5168$ | $\nu_8=64.2$ |
| | $r_{13}=+287.5$ | $d_{13}=38.532-3.430$ | | |
| $f_3=$ 113.2688 | $r_{14}=-1850.0$ | $d_{14}=4.0$ | $n_9=1.62041$ | $\nu_9=60.3$ |
| | $r_{15}=-77.683$ | $d_{15}=1.5$ | $n_{10}=1.59551$ | $\nu_{10}=39.2$ |
| | $r_{16}=-122.917$ | $d_{16}=0.1$ | | |
| | $r_{17}=+251.3$ | $d_{17}=5.3$ | $n_{11}=1.51728$ | $\nu_{11}=69.6$ |
| | $r_{18}=-85.15$ | $d_{18}=1.5$ | $n_{12}=1.75520$ | $\nu_{12}=27.5$ |
| | $r_{19}=-157.5$ | $d_{19}=83.912-3.177$ | | |

$f_4$= 275.744

| | | | |
|---|---|---|---|
| $r_{20}$=+203.9 | | | |
| | $d_{20}$=3.6 | $n_{13}$=1.51728 | $\nu_{13}$=69.6 |
| $r_{21}$=−309.7 | | | |
| | $d_{21}$=3.2 | | |
| $r_{22}$=+47.9 | | | |
| | $d_{22}$=6.2 | $n_{14}$=1.48606 | $\nu_{14}$=81.5 |
| $r_{23}$=− 459.0 | | | |
| | $d_{23}$=2.3 | $n_{15}$=1.717 | $\nu_{15}$=47.9 |
| $r_{24}$=+70.7 | | | |
| | $d_{24}$=71.5 | | |
| $r_{25}$=+271.0 | | | |
| | $d_{25}$=2.7 | $n_{16}$=1.5168 | $\nu_{16}$=64.2 |
| $r_{26}$=−165.7 | | | |
| | $d_{26}$=7.8 | | |
| $r_{27}$=−75.9 | | | |
| | $d_{27}$=1.4 | $n_{17}$=1.76684 | $\nu_{17}$=46.6 |
| $r_{28}$=+51.5 | | | |
| | $d_{28}$=4.8 | $n_{18}$=1.59507 | $\nu_{18}$=35.6 |
| $r_{29}$=−97.9 | | | |

wherein $f_1$, $f_2$ ...$f_4$ designate the focal lengths of respective four lens groups, $r_1$, $r_2$...$r_{29}$ designate the radii of curvature of successive lenses, $d_1$, $d_2$...$d_{28}$ designate the center thicknesses of, or air gaps between the successive lenses, $n_1$,$n_2$...$n_{18}$ designate the refractive indices of the lenses for d-line, and $\nu_1$, $\nu_2$...$\nu_{18}$ designate the Abbe numbers of the lenses.

3. An optical system for an ultra-telephoto type zoom lens system comprising a magnification varying portion including a first convergence lens group, a second divergence lens group, a third convergence lens group and a relay lens group disposed in the named order, said first, second and third lens groups forming an afocal magnification varying system, said second and third groups being axially differently movable in the same direction and said relay lens group forming a telephoto system having a positive Petzval sum; said first group including two components, of which the first component is a single biconvex lens, and the second component consists of a biconvex lens, a biconcave lens and a convex meniscus lens, the latter two of these three lenses cemented together; said second group including three components of which the first component consists of a biconvex lens and biconcave lens cemented together, the second component consists of a biconcave and convex meniscus lens cemented together to enhance the achromatism of the second divergent group as a whole, and the third component is a single biconcave lens; said third group including two components of which the first component consists of two meniscus lenses cemented together and the curvature of cemented surface being concave to the object side, and the second component consists of a biconvex lens and a concave meniscus lens cemented together [; and said relay lens group including two portions of which the first portion comprises two components, the first component thereof being a single biconvex lens, and the second component being a biconvex, biconcave and concave meniscus lenses cemented together, and the second portion comprises two components, the first component thereof being a single biconvex lens and the second component being a biconcave and biconvex lenses cemented together].

4. An optical system according to claim 3, possessing the following dimensions and relationships:

f = 360 −1200 mm, F/11 telephoto ratio 0.61

$f_1$= 420.955

| | | | |
|---|---|---|---|
| $r_1$=+441.5 | | | |
| | $d_1$=8.0 | $n_1$=1.48606 | $\nu_1$=81.5 |
| $r_2$=−580.0 | | | |
| | $d_2$=0.2 | | |
| $r_3$=+274.2 | | | |
| | $d_3$=9.5 | $n_2$=1.48606 | $\nu_2$=81.5 |
| $r_4$=−638.1 | | | |
| | $d_4$=1.0 | | |
| $r_5$=−638.1 | | | |
| | $d_5$=4.0 | $n_3$=1.744 | $\nu_3$=44.9 |
| $r_6$=+298.2 | | | |
| | $d_6$=6.0 | $n_4$=1.58913 | $\nu_4$=61.2 |
| $r_7$=+1281.5 | | | |
| | $d_7$=11.258−211.258 | | |

$f_2$= −86.956

| | | | |
|---|---|---|---|
| $r_8$=+8939.7 | | | |
| | $d_8$=4.7 | $n_5$=1.75520 | $\nu_5$=27.5 |
| $r_9$=−126.6 | | | |
| | $d_9$=2.6 | $n_6$=1.58913 | $\nu_6$=61.2 |
| $r_{10}$=+172.9 | | | |
| | $d_{10}$=6.0 | | |
| $r_{11}$=−166.7 | | | |
| | $d_{11}$=1.3 | $n_7$= 1.48606 | $\nu_7$=81.5 |
| [$r_{12}$=+118.2] *$r_{12}$=+118.3* | | | |
| | $d_{12}$=3.0 | $n_8$=1.58875 | $\nu_8$=51.2 |
| $r_{13}$=+238.7 | | | |
| | $d_{13}$=6.0 | | |
| $r_{14}$=−149.8 | | | |
| | $d_{14}$=2.6 | $n_9$=1.5168 | $\nu_9$=64.2 |
| $r_{15}$=+444.7 | | | |
| | $d_{15}$=64.853−4.248 | | |

$f_3$= 190.565

| | | | |
|---|---|---|---|
| $r_{16}$=−3106.9 | | | |
| | $d_{16}$=3.5 | $n_{10}$=1.62041 | $\nu_{10}$=60.3 |
| $r_{17}$=−134.2 | | | |
| | $d_{17}$=2.6 | $n_{11}$=1.61293 | $\nu_{11}$=36.9 |
| $r_{18}$=−203.7 | | | |
| | $d_{18}$=0.2 | | |
| $r_{19}$=+398.1 | | | |
| | $d_{19}$=4.7 | $n_{12}$=1.48606 | $\nu_{12}$=81.5 |
| $r_{20}$=−143.2 | | | |
| | $d_{20}$=2.6 | $n_{13}$=1.75520 | $\nu_{13}$=27.5 |
| $r_{21}$=−246.4 | | | |
| | $d_{21}$=143.138−3.744 | | |

$f_4$= 537.805

| | | | |
|---|---|---|---|
| $r_{22}$=+344.6 | | | |
| | $d_{22}$=4.0 | $n_{14}$ =1.51454 | $\nu_{14}$=54.6 |
| $r_{23}$=−577.7 | | | |
| | $d_{23}$=6.2 | | |
| $r_{24}$=+85.8 | | | |
| | $d_{24}$=6.0 | $n_{15}$=1.48606 | $\nu_{15}$=81.5 |
| $r_{25}$=−1535.0 | | | |
| | $d_{25}$=13.5 | $n_{16}$=1.744 | $\nu_{16}$=44.9 |
| $r_{26}$=+80.0 | | | |
| | $d_{26}$=6.3 | $n_{17}$=1.6393 | $\nu_{17}$=45.0 |
| $r_{27}$=+136.359 | | | |
| | $d_{27}$=139.4 | | |
| $r_{28}$=+385.1 | | | |
| | $d_{28}$=2.7 | $n_{18}$=1.50137 | $\nu_{18}$=56.5 |
| $r_{29}$=−385.1 | | | |
| | $d_{29}$=15.2 | | |
| $r_{30}$=−124.9 | | | |
| | $d_{30}$=2.8 | $n_{19}$=1.74443 | $\nu_{19}$=49.4 |
| $r_{31}$=+87.5 | | | |
| | $d_{31}$=4.4 | $n_{20}$=1.60342 | $\nu_{20}$=38.0 |
| $r_{32}$=−200.4 | | | |

wherein $f_1$, $f_2$...$f_4$ designate the focal lengths of respective four lens group, $r_1$, $r_2$...$r_{32}$ designate the radii of curvature of successive lenses, $d_1$, $d_2$...$d_{31}$ designate the center thicknesses of, or air gaps between the successive lenses, $n_1$, $n_2$...$n_{20}$ designate the refractive indices of the lenses for d-line, and $\nu_1$, $\nu_2$...$\nu_{20}$ designate the Abbe numbers of the lenses.

5. An optical system for an ultra-telephoto type zoom lens comprising a magnification varying portion including a first convergence lens group, a divergence lens group, and a second convergence lens group disposed in the named order from the object side of the system and having focal lengths designated, respectively, by $f_1$, $f_2$ and $f_3$, and a relay lens group having a focal length designated by $f_4$, said optical system satisfying the following numerical data wherein, $r_1$, $r_2$...$r_{32}$ designate the radii of curvature of the successive lenses, $d_1$, $d_2$...$d_{31}$ designate the center thickness of, or air gaps between the successive lenses, $n_1$, $n_2$...$n_{20}$ designate the refractive indices of the lenses for d-line, and $v_1, v_2 \ldots v_{20}$ designate the Abbe numbers of the lenses:

| | | | | |
|---|---|---|---|---|
| $f_1=$ 420.955 | $r_1=+441.5$ | $d_1=8.0$ | $n_1=1.48606$ | $v_1=81.5$ |
| | $r_2=-580.0$ | $d_2=0.2$ | | |
| | $r_3=+274.2$ | $d_3=9.5$ | $n_2=1.48606$ | $v_2=81.5$ |
| | $r_4=-638.1$ | $d_4=1.0$ | | |
| | $r_5=-638.1$ | $d_5=4.0$ | $n_3=1.744$ | $v_3=44.9$ |
| | $r_6=+298.2$ | $d_6=6.0$ | $n_4=1.589.13$ | $n_4=61.2$ |
| | $r_7=+1281.5$ | $d_7=11.258-211.258$ | | |
| $f_2=$ −86.956 | $r_8=+8939.7$ | $d_8=4.7$ | $n_5=1.75520$ | $v_5=27.5$ |
| | $r_9=-126.6$ | $d_9=2.6$ | $n_6=1.58913$ | $v_6=61.2$ |
| | $r_{10}=+172.9$ | $d_{10}=6.0$ | | |
| | $r_{11}=-166.7$ | $d_{11}=1.3$ | $n_7=1.48606$ | $v_7=81.5$ |
| | $r_{12}=+118.3$ | $d_{12}=3.0$ | $n_8=1.58875$ | $v_8=51.2$ |
| | $r_{13}=+238.7$ | $d_{13}=6.0$ | | |
| | $r_{14}=-149.8$ | $d_{14}=2.6$ | $n_9=1.5168$ | $v_9=64.2$ |
| | $r_{15}=+444.7$ | $d_{15}=64.853-4.248$ | | |
| $f_2=$ 190.565 | $r_{16}=-3106.9$ | $d_{16}=3.5$ | $n_{10}=1.62041$ | $v_{10}=60.3$ |
| | $r_{17}=-134.2$ | $d_{17}=2.6$ | $n_{11}=1.61293$ | $v_{11}=36.9$ |
| | $r_{18}=-203.7$ | $d_{18}=0.2$ | | |
| | $r_{19}=+398.1$ | $d_{19}=4.7$ | $n_{12}=1.48606$ | $v_{12}=81.5$ |
| | $r_{20}=-143.2$ | $d_{20}=2.6$ | $n_{13}=1.75520$ | $v_{13}=27.5$ |
| | $r_{21}=-246.4$ | $d_{21}=143.138-3.744$ | | |
| $f_4=$ 537.805 | $r_{22}=+344.6$ | $d_{22}=4.0$ | $n_{14}=1.51454$ | $v_{14}=54.6$ |
| | $r_{23}=-577.7$ | $d_{23}=6.2$ | | |
| | $r_{24}=+85.8$ | $d_{24}=6.0$ | $n_{15}=1.48606$ | $v_{15}=81.5$ |
| | $r_{25}=-1535.0$ | $d_{25}=13.5$ | $n_{16}=1.744$ | $v_{16}=44.9$ |
| | $r_{26}=+80.0$ | $d_{26}=6.3$ | $n_{17}=1.6393$ | $v_{17}=45.0$ |
| | $r_{27}=+136.359$ | $d_{27}=139.4$ | | |
| | $r_{28}=+385.1$ | $d_{28}=2.7$ | $n_{18}=1.50137$ | $v_{18}=56.5$ |
| | $r_{29}=-385.1$ | $d_{29}=15.2$ | | |
| | $r_{30}=-124.9$ | $d_{30}=2.8$ | $n_{19}=1.74443$ | $v_{19}=49.4$ |
| | $r_{31}=+87.5$ | $d_{31}=4.4$ | $n_{20}=1.60342$ | $v_{20}=38.0$ |
| | $r_{32}=-200.4$ | | | |

6. An optical system for an ultra-telephoto type zoom lens comprising a magnification varying portion including a first convergence lens group, a divergence lens group, and a second convergence lens group disposed in the named order from the object side of the system and having focal lengths designated, respectively, by $f_1$, $f_2$ and $f_3$, and a relay lens group having a focal length designated by $f_4$, said optical system satisfying the following numerical data wherein, $r_1, r_2 \ldots r_{29}$ designate the radii of curvature of the successive lenses, $d_1, d_2 \ldots d_{28}$ designate the center thicknesses of, or air gaps between the successive lenses, $n_1, n_2 \ldots n_{18}$ designate the refractive indices of the lenses for d-line, and $v_1, v_2 \ldots v_{18}$ designate the Abbe numbers of the lenses:

| | | | | |
|---|---|---|---|---|
| $f_1=$ 244.0 | $r_1=+264.9$ | $d_1=7.0$ | $n_1=1.51728$ | $v_1=69.6$ |
| | $r_2=-370.0$ | $d_2=0.2$ | | |
| | $r_3=+174.9$ | $d_3=8.2$ | $n_2=1.48606$ | $v_2=81.5$ |
| | $r_4=-353.1$ | $d_4=2.0$ | $n_3=1.74950$ | $v_3=35.0$ |
| | $r_5=+180.8$ | $d_5=5.0$ | $n_4=1.59507$ | $v_4=35.6$ |
| | $r_6=+1195.6$ | $d_6=2.474-118.311$ | | |
| $f_2=$ −50.3639 | $r_7=+5000.0$ | $d_7=4.8$ | $n_5=1.7847$ | $v_5=26.1$ |
| | $r_8=-70.3$ | $d_8=1.5$ | $n_6=1.62041$ | $v_6=60.3$ |
| | $r_9=+104.02$ | $d_9=4.0$ | | |
| | $r_{10}=-96.6$ | $d_{10}=2.0$ | $n_7=1.5168$ | $v_7=64.2$ |
| | $r_{11}=+220.9$ | $d_{11}=4.0$ | | |
| | $r_{12}=-83.0$ | $d_{12}=1.5$ | $n_8=1.5168$ | $v_8=64.2$ |
| | $r_{13}=+287.5$ | $d_{13}=38.532-3.430$ | | |
| $f_3=$ 113.2688 | $r_{14}=-1850.0$ | $d_{14}=4.0$ | $n_9=1.62041$ | $v_9=60.3$ |
| | $r_{15}=-77.683$ | $d_{15}=1.5$ | $n_{10}=1.59551$ | $v_{10}=39.2$ |
| | $r_{16}=-122.917$ | $d_{16}=0.1$ | | |
| | [$r_{17}=+251.3$/] $r_{17}=+251.3$ | $d_{17}=5.3$ | $n_{11}=1.51728$ | $v_{11}=69.6$ |
| | [$r_{18}=-85.15$/] $r_{18}=-85.15$ | $d_{18}=1.5$ | $n_{12}=1.75520$ | $v_{12}=27.5$ |
| | $r_{19}=-157.5$ | $d_{19}=83.912-3.177$ | | |
| $f_4=$ 275.744 | $r_{20}=+203.9$ | $d_{20}=3.6$ | $n_{13}=1.51728$ | $v_{13}=69.6$ |
| | $r_{21}=-309.7$ | $d_{21}=3.2$ | | |
| | $r_{22}=+47.9$ | $d_{22}=6.2$ | $n_{14}=1.48606$ | $v_{14}=81.5$ |
| | $r_{23}=-459.0$ | $d_{23}=2.3$ | $n_{15}=1.717$ | $v_{15}=47.9$ |
| | $r_{24}=+70.7$ | $d_{24}=71.5$ | | |
| | $r_{25}=+271.0$ | $d_{25}=2.7$ | $n_{16}=1.5168$ | $v_{16}=64.2$ |
| | $r_{26}=-165.7$ | $d_{26}=7.8$ | | |
| | $r_{27}=-75.9$ | $d_{27}=1.4$ | $n_{17}=1.76684$ | $v_{17}=46.6$ |
| | $r_{28}=+51.5$ | $d_{28}=4.8$ | $n_{18}=1.59507$ | $v_{18}=35.6$ |
| | $r_{29}=-97.9$ | | | |

* * * * *

UNITED STATES PATENT OFFICE

CERTIFICATE OF CORRECTION

Patent No. Re. 28,591 Dated October 28, 1975

Inventor(s) SOICHI NAKAMURA

It is certified that error appears in the above-identified patent and that said Letters Patent are hereby corrected as shown below:

Column 5, line 15, change "the" to -- an --; line 46, before "two-component" insert -- the --.

Column 7, under [$r_{29}$=385.1], insert -- $r_{29}$=-385.1 --; under [$d_{29}$=15.2], delete "$r_{28}$=+385.1".

Column 9, line 43, change "biconcave" to -- biconvex --.

Column 12, beneath $r_8$=+8939.7, change "$d_8$-4.7" to -- $d_8$=4.7 --.

Signed and Sealed this twenty-third Day of March 1976

[SEAL]

Attest:

RUTH C. MASON
*Attesting Officer*

C. MARSHALL DANN
*Commissioner of Patents and Trademarks*